(12) United States Patent
Daley, III (10) Patent No.: US 7,876,558 B2
(45) Date of Patent: *Jan. 25, 2011

(54) BAG COMPUTER WITH INTERIOR ACCESS COUPLING

(76) Inventor: Charles A. Daley, III, PO Box 184, Karon PO, T. Karon, A. Muang, Phuket (TH) 83100

( * ) Notice: Subject to any disclaimer, the term of this patent is extended or adjusted under 35 U.S.C. 154(b) by 0 days.

This patent is subject to a terminal disclaimer.

(21) Appl. No.: 12/384,419

(22) Filed: Apr. 6, 2009

(65) Prior Publication Data

US 2009/0190296 A1 Jul. 30, 2009

Related U.S. Application Data

(63) Continuation-in-part of application No. 11/796,920, filed on May 1, 2007, now abandoned.

(60) Provisional application No. 61/124,239, filed on Apr. 16, 2008, provisional application No. 61/125,717, filed on Apr. 29, 2008, provisional application No. 61/123,308, filed on Apr. 8, 2008.

(51) Int. Cl.
*G06F 1/16* (2006.01)
(52) U.S. Cl. .................................. 361/679.55; 206/320
(58) Field of Classification Search ............ 361/679.03, 361/679.55; 206/320
See application file for complete search history.

(56) References Cited

U.S. PATENT DOCUMENTS

| | | | | |
|---|---|---|---|---|
| 5,445,266 A * | 8/1995 | Prete et al. | .................. | 206/320 |
| 5,887,723 A * | 3/1999 | Myles et al. | .................. | 206/760 |
| 6,167,413 A * | 12/2000 | Daley, III | .................. | 708/139 |
| 6,269,948 B1 * | 8/2001 | Jackson | .................. | 206/320 |
| 6,283,299 B1 * | 9/2001 | Lee | .................. | 206/760 |
| 6,763,942 B1 * | 7/2004 | Yeh | .................. | 206/320 |
| 6,956,614 B1 * | 10/2005 | Quintana et al. | .................. | 348/373 |
| 6,962,277 B2 * | 11/2005 | Quintana et al. | .................. | 224/262 |
| 7,265,970 B2 * | 9/2007 | Jordan | .................. | 361/679.27 |
| 2005/0011920 A1 * | 1/2005 | Feng | .................. | 224/275 |
| 2005/0103815 A1 * | 5/2005 | Lee et al. | .................. | 224/275 |
| 2006/0113213 A1 * | 6/2006 | Daley | .................. | 206/576 |
| 2006/0163303 A1 * | 7/2006 | Trutanich | .................. | 224/576 |
| 2007/0199844 A1 * | 8/2007 | Daley | .................. | 206/320 |
| 2007/0201201 A1 * | 8/2007 | Daley, III | .................. | 361/683 |
| 2008/0192421 A1 * | 8/2008 | Daley | .................. | 361/681 |
| 2008/0273298 A1 * | 11/2008 | Daley | .................. | 361/683 |
| 2009/0009476 A1 * | 1/2009 | Daley, III | .................. | 345/168 |
| 2009/0009938 A1 * | 1/2009 | Daley, III | .................. | 361/680 |
| 2009/0046416 A1 * | 2/2009 | Daley, III | .................. | 361/679.55 |
| 2009/0107877 A1 * | 4/2009 | Daley, III | .................. | 206/576 |
| 2009/0107878 A1 * | 4/2009 | Daley, III | .................. | 206/576 |

(Continued)

*Primary Examiner*—Lisa Lea-Edmonds (57) ABSTRACT

Disclosed is a bag computer comprised of a bag with holder and computer with display panel and body panels hinged together. The computer body installs into the holder so the display panel pivots near the top of the bag front with its display facing outward/upward so the bag wearer can store the display against the bag front or pivot it into his line of sight. To provide access between peripherals, memory or batteries inside the bag and the computer outside the bag, the bag's front wall may have; 1) an opening with coupling matching the computer back side; 2) a pattern of holes matching a computer with inside and outside body parts which join with attachments through the pattern of holes; 3) an electrical connection in the holder which connects the computer to a connection box inside bag.

6 Claims, 7 Drawing Sheets

U.S. PATENT DOCUMENTS

2009/0141446 A1*  6/2009  Daley, III ............... 361/679.55
2009/0185342 A1*  7/2009  Daley, III ............... 361/679.27
2009/0201637 A1*  8/2009  Daley, III ............... 361/679.29
2009/0225508 A1*  9/2009  Daley, III ............... 361/679.27
2009/0225509 A1*  9/2009  Daley, III ............... 361/679.29
2009/0236247 A1*  9/2009  Daley, III ................... 206/320
2009/0284908 A1* 11/2009  Daley, III ............... 361/679.17

* cited by examiner

BAG COMPUTER WITH INTERIOR ACCESS COUPLING

CROSS-REFERENCE TO RELATED APPLICATIONS

This application is a Continuation-In-Part and claims the filing benefit under 35 U.S.C. §120 of U.S. application Ser. No. 11/796,920, filed May 1, 2007 now abandoned and is incorporated herein by reference.

This application claims the filing benefit under 35 U.S.C. §119(e) of U.S. Provisional Application No. 61/124,239, filed on Apr. 18, 2008, the entire teachings of which are incorporated herein by reference.

This application claims the filing benefit under 35 U.S.C. §119(e) of U.S. Provisional Application No. 61/125,717, filed on Apr. 29, 2008, the entire teachings of which are incorporated herein by reference.

This application claims the filing benefit under 35 U.S.C. §119(e) of U.S. Provisional Application No. 61/123,308, filed on Apr. 8, 2008, the entire teachings of which are incorporated herein by reference.

TECHNICAL FIELD

The present invention relates to a computer designed for mobile use.

BACKGROUND OF THE INVENTION

An invention including the basic structure of a bag computer was disclosed in application Ser. No. 11/796,920 filed May 1, 2007. Attributes described include a bag with a pivotally and removably mounted display panel located near the bag's upper front corner, a pivoting cover which may include a keyboard or electronic write pad, a touchpad or other manual input devices located on the back of the pivoting display panel, a computer for the bag with a display panel pivotally attached to a body panel where the display faces out and a gap for bag or holder material between the display and body panels when closed, computer holders to hold this two panel computer to the bag outside front, facilities for mounting a computing unit or peripherals on the inside of the bag's front wall, and electrical access from an outside mounted computer to inside mounted peripherals.

This application includes improvements on the bag computer, specifically communication between the outside mounted equipment and peripherals inside the bag. Electrical access between computing equipment mounted to the inside and outside of a bag is not a new development. However, in the context of the bag computer, inventive ways to communicate between the bag computer's outside mounted computing equipment and inside peripherals improve the utility of the invention.

BRIEF DESCRIPTION OF THE INVENTION

A bag computer is a bag with a display panel, including input/output devices such as a display and graphic user input device, mounted to the exterior of the bag so it may pivot horizontally from a storage position parallel to the bag's front wall to a position away from the bag's front wall where the bag wearer/operator may view it. The computer and display may be removable from the bag for replacement. The computer may be positioned near the top front of the bag computer so that its display panel is as close as possible to the operator/wearer's eyes when it is pivoted out into the line of sight of the operator for use. There are several ways to create this arrangement.

In one way to create a bag computer, there may be a bag with a computer holder, such as a holster or pocket, on the exterior of its front wall with a two panel computer mounted to it.

The two panel computer has a display panel and body panel pivotally joined with a hinge so that the display pivots horizontally when mounted in the bag's computer holder. The display is on the outward/upward facing surface of the display panel so it is visible to the bag wearer. The body panel matches the bag's front wall computer holder. The pivot point between the two panels is configured to create a gap between the display panel and body panel so that the display panel may close approximately parallel to the bag front when stored. The display panel may have controls on its side opposite the display.

To have access from peripherals carried inside the bag to the two panel computer mounted on the exterior of the bag front, the front wall adjacent to the computer may be adapted for this purpose by including an interior access coupling which has matching parts on the bag front wall and two panel computer body panel.

There are three embodiments: 1) The bag's front wall may have an opening which includes a coupling to align and join the two panel computer in the computer holder to the bag front: 2) The bag front wall may have a pattern of holes which match a two panel computer with a body panel having an inside part and an outside part which join together with matching attachments through the bag's pattern of holes: 3) The bag's front wall may have an electrical connection which connects to the two panel computer in the holder and connects the computer to a connection box on the inside surface of the bag's front wall. The bag may also have a pivoting cover and may have the apparatus to mount a keyboard on or near a pivoting cover.

DETAILED DESCRIPTION OF THE INVENTION

A bag computer is a bag with a display panel, including input/output devices such as a display and graphic user input device, mounted to the exterior of the bag so it may pivot horizontally from a storage position parallel to the bag's front wall to a position away from the bag's front wall where the bag wearer/operator may view it. The computing unit and display may be removable from the bag for replacement. The display panel may be positioned near the top front of the bag so that its display is as close as possible to the operator/wearer's eyes when it is pivoted out into the line of sight of the operator for use.

Figure 1:
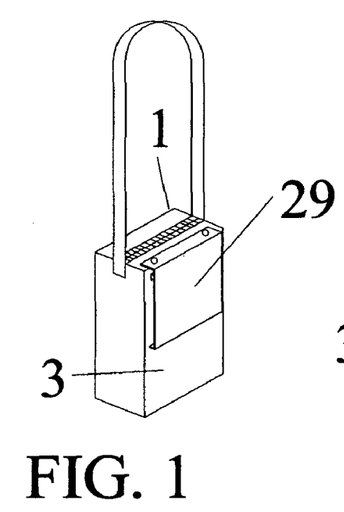
FIG. 1 This is a view of a bag computer in stored position with its display panel pivoted down over and parallel to the bag's front wall and covered with a cover.
Figure 2:
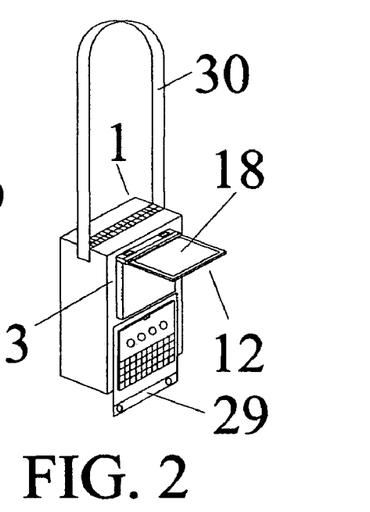
FIG. 2 This is the bag computer with its cover open and its display panel pivoted into the line of sight of the wearer/operator.
Figures 3A, 3B, 3C:
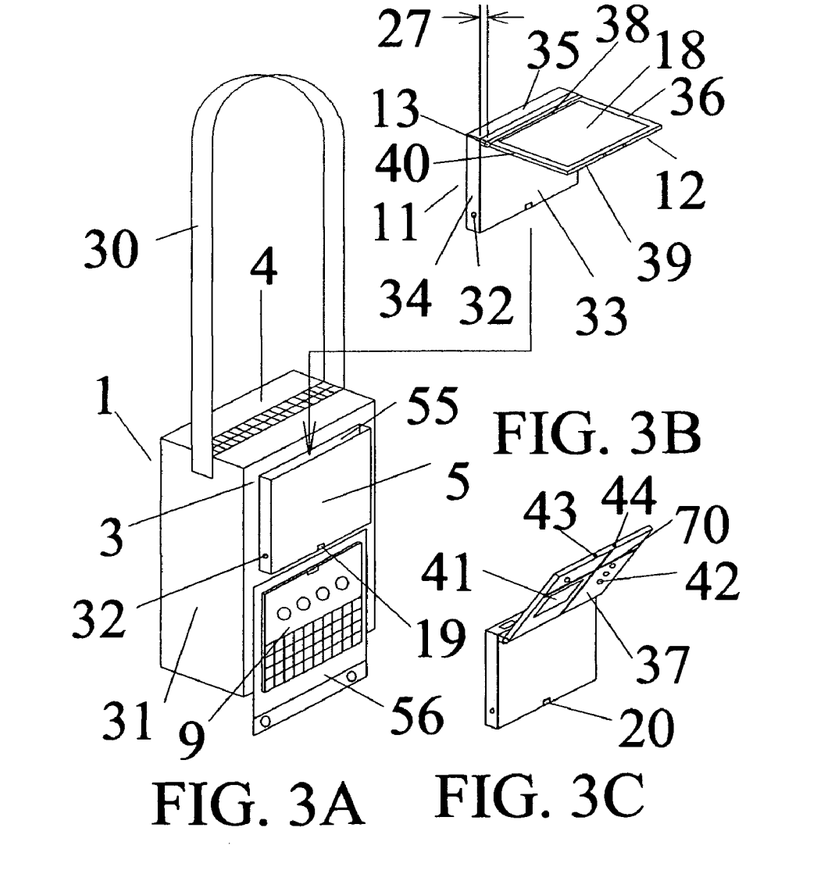
FIG. 3A This is the bag computer with the two panel computer removed from the computer holder on the exterior of the bag front wall.
FIG. 3B This is the two panel computer component of the bag computer. It has two panels, the display panel and body panel, pivotally connected.
FIG. 3C This is the two panel computer component of the bag computer with its display panel pivoted to show the back side opposite the display. This side has input/output devices.

FIGS. 1, 2 and 3 show how a bag computer is deployed and used. As shown in FIG. 1 the display panel, when mounted to the bag 1, is stored flat against the bag front wall 3 and may be covered with a cover 29, such as a cover flap or rigid shaped cover.

Shown in FIG. 2, when the cover 29 is repositioned, the display panel 12 is pivoted into open position away from the bag front wall 3 with its display facing up, properly oriented so that when the bag computer is attached to the operators/wearer by its strap 30 the display 18 is in the line of sight of the operator/bag wearer and can be viewed and used. Controls on the display panel back side can be used with the hands at the same time.

Shown in FIGS. 3A and 3B, one way of achieving this arrangement is to have a two panel computer FIG. 3B mounted to a bag FIG. 3A front with matching holder wherein the two panel computer is comprised of a body panel 11 pivotally mounted to a display panel 12.

Shown in FIG. 3A, the bag 1 has a front wall 3, opposite back wall, a bottom wall and two side walls 31. There is a top wall 4 with an opening for access to the bag's interior and this opening may have a closure fitting such as a zipper. The interior of the bag may be used to carry and store general cargo as well as peripherals and/or batteries for the two panel computer. Each wall has an inside surface and outside surface. The bag has a strap 30 for carrying the bag computer when stored and for suspending the bag computer in front of the wearer/operator when in use.

On the outside of the bag front wall there is a computer holder such as a holster 5, pocket or band with a size and shape to fit the matching body panel to hold the two panel computer to the bag front. The computer holder may be sewn, riveted, or otherwise attached to the bag front. The holder is designed to protect and cover the body panel and its edges and corners as well as holding it to the bag front in the proper position. The computer holder has an opening 55 for installing the two panel computer and this may be at the top of the holder. The computer holder may be attached to the bag so that the hinge area 13 of the two panel computer, when installed to the bag, is close to the junction of the top and front bag walls thus allowing the display panel to be as close as possible to the bag computer operator/wearer's eyes.

The computer holder is shaped to fit the two panel computer body panel and may be made of rigid, semi-rigid or flexible material such as cloth, plastic or metal. The computer holder may be partially or completely made of a material permeable to air or may have cooling openings in it so as to facilitate cooling of the two panel computer. The computer holder may be wholly or partially made of elastic material to improve the fit of the body panel to the computer holder. For thin body panels, the holder may be a flat panel without sides of bottom attached to the bag front. For thicker body panels, the holder may have sides and/or bottom.

The computer holder may have one or more openings to align with tools such as controls, camera or infra red communicator on the body panel front surface. There may be an opening 19 in or near the computer holder bottom side to align with a communicator, for example infrared, on the bottom surface 20 of the two panel computer's body panel. Any of these openings may have a rim or coupling to match and attach to the body panel, seal and reinforce the opening.

The computer holder may include one or more retainer fixtures 32, such as a flap, snap or hole, to help keep the two panel computer in the computer holder and these may match and/or attach to retainer fixtures on the body panel.

The bag may have a cover for the two panel computer and this cover may be a flap attached near the bag's center and pivot on a horizontal axis up to cover the two panel computer when stored. The cover may include a manual character input device, such as a keyboard 9 or electronic write pad, attached to the cover inside surface 56 adjacent to the front side of the display panel when closed in the stored position or may have attachments on the cover inside surface to removably attach such an input device to the cover. The cover may be rigid and may be shaped to match and protect the display in stored position. This cover may be pivotally attached to the bag front or may be attached to the inside surface of a separate cover.

To match the bag and computer holder, there is a two panel computer FIG. 3B which has a body panel 11 and a display panel 12. These are pivotally joined with a hinge means 13. These two panels are in closed position when the display panel back side and body panel front surface are adjacent and approximately parallel and the display is facing away from the body panel. The two panel computer is in open position when the two panels are pivoted into other positions. Other computing equipment, such as the computing unit, batteries and/or communication equipment, may be located in the body panel, display panel or in both.

The body panel matches and fits the computer holder and has a front surface 33 adjacent to the display panel when the two panels are folded together in closed position. There is an opposite back surface, two side surfaces 34, bottom surface and a top surface 35. The display panel pivotally attaches to the body panel so that it pivots near the junction of the top and front body panel surfaces.

There may also be one or more tools such as controls, camera or infrared communicator on the body panel front surface and this may be positioned to align with a hole in the computer holder for external communication. There may be attachments around any tool to match attachments on the bag or computer holder to retain the computer in the computer holder. There may be one or more retainer 32 attachments on the body panel to match attachments on the computer holder and retain the two panel computer in the computer holder.

The display panel 12 has a back side adjacent to the body panel when closed, an opposite front side 36, a hinge edge 38, a distal edge 39 and two side edges 40. The display 18 is located on the front side of the display panel 12 so that when the display panel of the installed two panel computer is pivoted open it moves into the line of sight of the operator/wearer of the bag computer.

The display panel is connected to the body panel with a hinge means near the display panel hinge edge. The display panel and/or the body panel adjacent to the hinge means connecting them create an extension 27 away from the body panel so that there is a gap between the body panel front surface and display panel back side to allow the material of the computer holder to fit between the panels so that the display panel can be pivoted to a closed position approximately parallel to the bag front wall when the two panel computer is installed to the bag. The hinge may allow the display panel to pivot 180 degrees or more so that the operator/wearer of the bag computer may view the display from behind the bag.

Shown in FIG. 3C is the two panel computer with its display panel pivoted upward so that the display panel back side is visible. The back side 37 of the display panel may have controls, such as a pointing device, touch pad 41, buttons 42 or slides, to operate the two panel computer. The all or most of the back side may be touch pad and finger guides 70 may be used to assist the operator in finding the individual controls. In this way the operator can both view and control the two panel computer using input/output devices on the front and back sides of the display panel. There may also be input/output devices, such as a camera 43, infrared communicator 44, on the display panel distal edge. There may be additional controls on the display panel side edges.

To provide access to the two panel computer's body panel back surface from the interior of the bag so that batteries, memory or other peripherals inside the bag may be connected to the two panel computer, the bag and two panel computer combination may be adapted according to several embodiments.

This combination includes an interior access coupling between the two panel computer's body panel and bag front wall and comprises a bag part interior access coupling on the bag front which matches a computer part interior access coupling on the two panel computer's body panel. The interior access coupling is located so that it engages when the body panel is installed into the computer holder.

Figure 4:
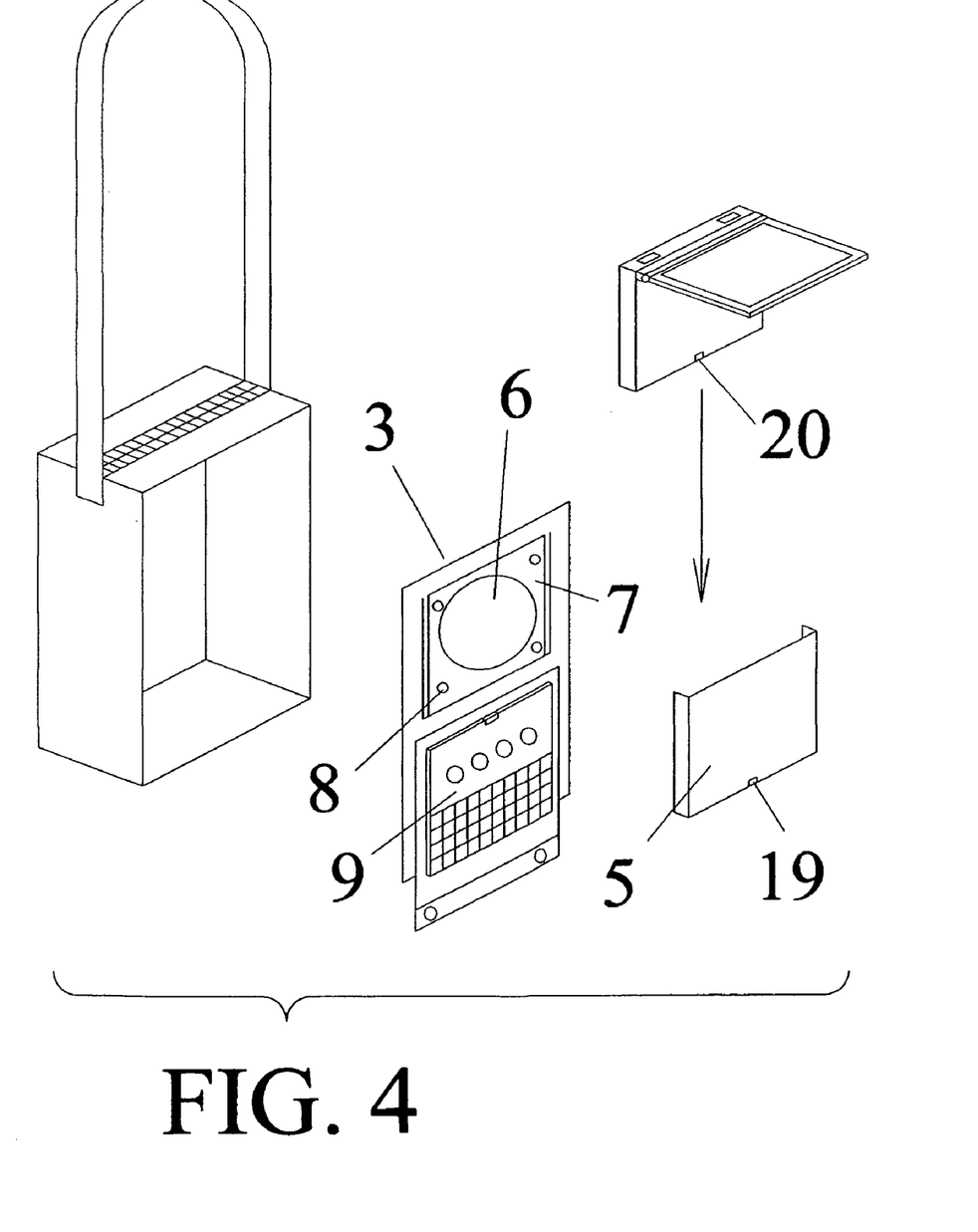
FIG. 4 This is an exploded view of a bag computer which has an opening in its front wall to access controls and connections on the two panel computer body back surface.

In one embodiment, shown in exploded view FIG. 4, the interior access coupling aligns and provides access to controls, electrical plugs and peripheral mounts on the back surface of the two panel computer's body panel, by employing an opening 6 in the bag front wall 3 adjacent to the back surface of the body panel when held in the computer holder 5. The opening may be large enough to expose a substantial part of the body panel back surface so that connections can be made easily.

The bag interior access coupling is located on the bag front wall 3 adjacent to the computer holder 5 so that it may be engaged while the body panel is in the computer holder. The bag front opening has a bag part interior access coupling 7 which forms a rim around the opening. The coupling may have parts such as attachments 8, seal and/or alignment structures, facing and matching the body panel's back surface. The coupling thus serves to align the bag to body panel back surface controls and connections, to secure the two panel computer inside the computer holder and the bag front, to reinforce the edge of the opening and to keep objects in the bag from wedging between the bag front and body panel back surface.

A manual character input device 9 on the bag exterior front wall may also communicate with the two panel computer wirelessly, for example infrared, and this may broadcast between input device and a transceiver 20 near the bottom of the two panel computer through an opening 19 in the computer holder.

Figure 5:
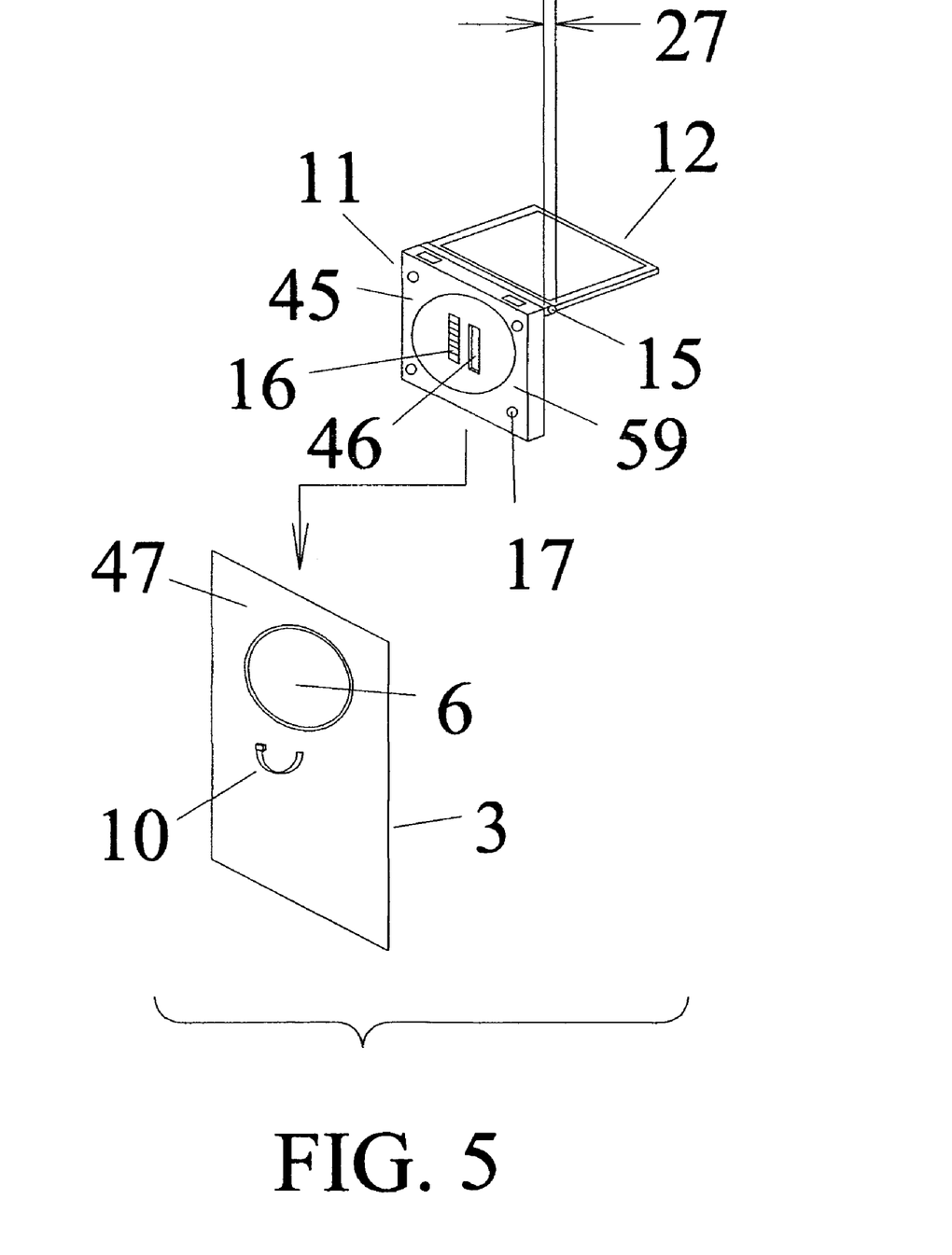
FIG. 5 This is a partial view of the bag computer of FIG. 4 showing its front wall inside surface and the back side of the computer part.

Shown in FIG. 5, a view of the bag front wall inside surface 47 and body panel back surface, the body panel back surface 45 may have controls, electrical plugs 16 and/or peripheral mounts 46. On the body panel back surface there is a computer part interior access coupling 59 matching the bag's coupling, including attachments 17 and/or alignment structures, to align and secure the body panel to the bag front wall 3 opening 6 while it is inside the computer holder. This drawing shows that the pivoting connection 15 between the two panel computer's display panel 12 and body panel 11 creates a gap 27 to allow the computer holder material to fit between the two panels when they are in stored position.

To install the two panel computer to the bag, the body panel is inserted into the computer holder, in this case from the top, with the display remaining on the outside of the computer holder. The bag part interior access coupling is engaged to the matching computer part interior access coupling on the body panel back surface. In this way, the two panel computer is securely held in the computer holder and there is access to controls, electrical plugs and/or peripheral mounts from the inside of the bag where these items may be held.

An electrical connection from the manual character input device on the bag exterior front wall to the two panel computer may be by a wire 10 leading from the input device through the bag's front wall and leading to the two panel computer's body panel.

Figure 6:
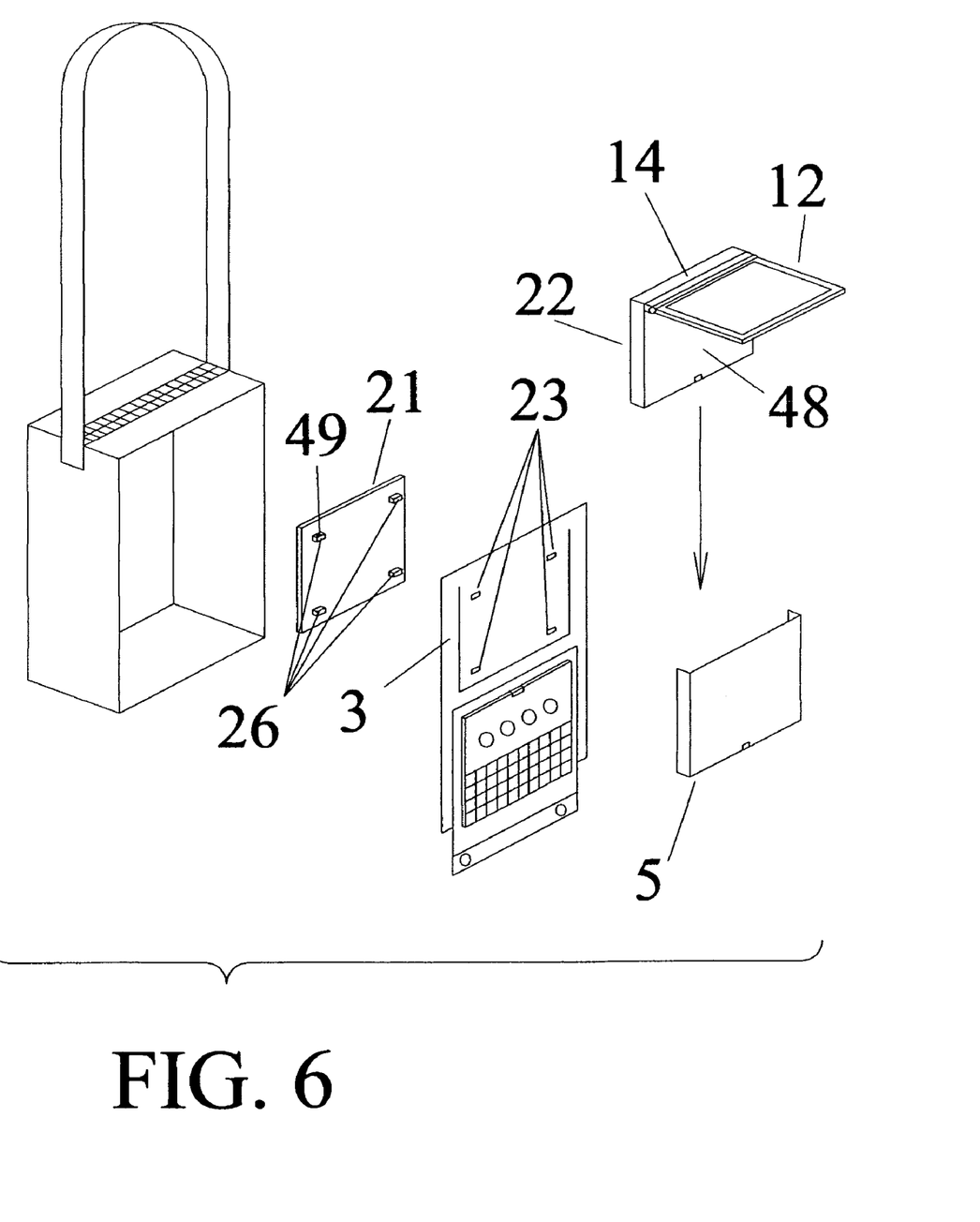
FIG. 6 This is an exploded view of a bag computer where the computer body panel is divided into a front body panel part and back body panel part for clamping to the bag front wall FIG. 7 This is a partial view of the bag computer of FIG. 6 showing the bag's front wall inside surface, back body panel part and the back surface of the front body panel part.

In a second embodiment, shown in exploded view FIG. 6, to provide access to controls, electrical plugs, peripherals and peripheral mounts on the back surface of the body panel, the interior access coupling is comprised of the two panel computer's body panel being divided into a back body panel part 21 and a front body panel part 22 which may be attached together with matching attachments through a pattern of holes 23 in the bag front wall 3. While clamping the two panel computer parts to the bag front wall, the matching attachments and bag holes also serve to secure the two panel computer to the bag and in computer holder, to align the parts, and to physically and electrically connect the front and back body parts.

The bag interior access coupling is comprised of a pattern of holes located on the bag front wall 3 adjacent to the computer holder 5 so that it may be engaged to the two panel computer while the body panel is in the computer holder. The holes may be trimmed, with stitching or grommets for example, to strengthen them.

To comprise the computer part interior access coupling, the body panel is divided into two parts; the front body panel part 22, pivotally connected to the display, and the back body panel part 21. The two body panel parts have matching attachments to physically and electrically connect the two parts. The attachments between the two body parts allow for a gap between the two body parts so that the bag front material can fit between them.

The front body panel part has a front surface 48 adjacent to the display panel 12 when the two panels are folded together. There is an opposite back surface, a top surface 14 and connecting side surfaces. The back surface of the front body panel part has attachments such as plugs and/or sockets to match and attach to attachments 26 from the back body panel part. The area around the attachments may be shaped to fit the bag front material. One or more attachments may include an electrical connection 49 to electrically connect the front body panel part and back body panel part. The display panel pivotally attaches on a horizontal axis by its hinge edge to the front body panel part near the junction of the front body panel part's front surface and top surface.

Figure 7:
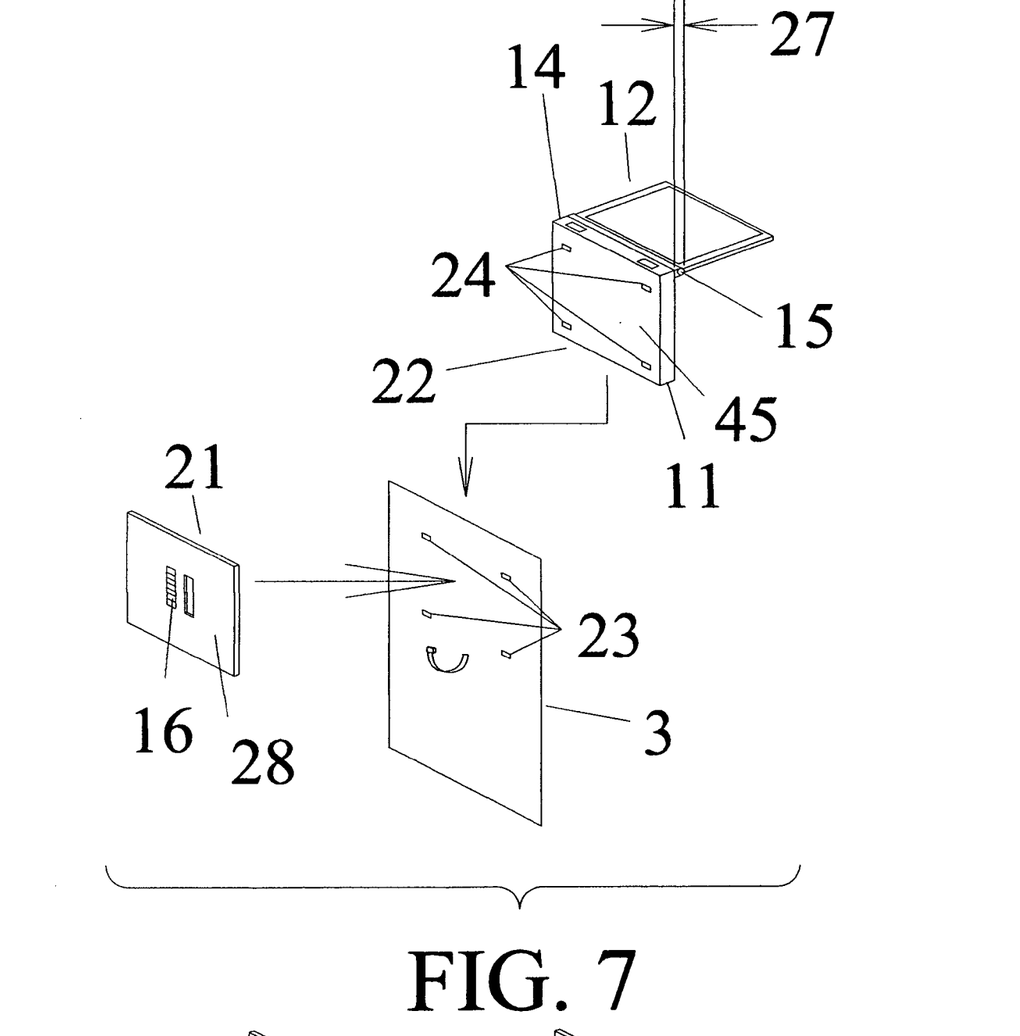

Shown in FIG. 7, a partial view of the inside surface of the bag front wall and back of the two panel computer, the back body panel part 21 has a front surface adjacent to the inside surface of the bag front when installed, an opposite back surface 28 and connecting sides. The back body panel part back or connecting sides may have controls, peripheral mounts, electrical plugs 16 or other physical or electric connections to allow connection to peripherals, batteries, or other tools held in the bag's interior cargo area. This drawing shows that the pivoting connection 15 between the display panel 12 and body panel 11 creates a gap 27 to allow the computer holder material to fit between the two panels when they are in stored position.

The front surface of the back body panel part has attachments, such as plugs and/or sockets, to match and attach to the attachments 24 in the back surface 45 of the front body panel part 22 to physically and electrically connect them and the bag through the pattern of holes 23 in the bag's front wall 3 which comprises the bag part interior access coupling. The area around the attachments may be shaped to fit the bag front material. The attachments may include locks to secure the complimentary attachments parts together and may also include release mechanisms to disengage and detach the back body part from the front body part.

Figure 8:
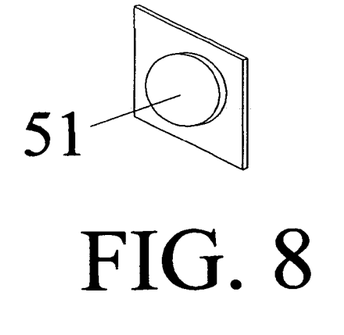
FIG. 8 This is the back surface of an alternative back body panel part having a built in peripheral.
Figure 9:
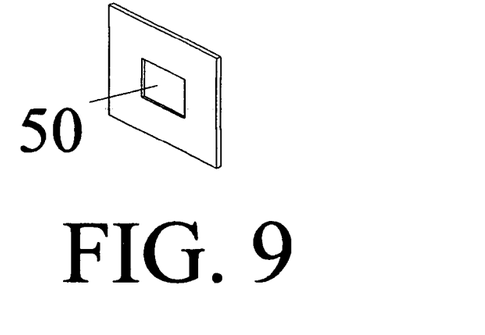
FIG. 9 This is the back surface of an alternative back body panel part having a recessed area for mounting a peripheral.

As shown in FIGS. 8 and 9, there may be several alternative styles of back body part such as ones with electrical plugs, ones with recessed areas to match and mounting peripherals 50 or ones which may be entirely one peripheral 51, such as a disk drive. These may be interchangeable with the same front body part. The back body panel part may include computing equipment, may include just connections for peripherals or may have no electronics and be used primarily to hold the front body panel part to the bag. Likewise, the front body panel part may include computing equipment, may include connections for peripherals or may have no electronics and be used primarily to hold the display panel to the bag.

To install the two panel computer in the bag, the front body panel part is inserted into the computer holder, in this case from the top, with the display remaining on the outside of the computer holder. The back body panel part is put into the bags cargo area and its attachments connected through the bag's front wall pattern of holes and to the attachments on the back of the front body panel part thus securing the two body panel parts together electrically and physically with the bag's front wall secured between them. In this way, the two panel computer is securely held in the computer holder and there is access to controls, electrical plugs and/or peripheral mounts from the inside of the bag where these items may be held.

Figure 10:
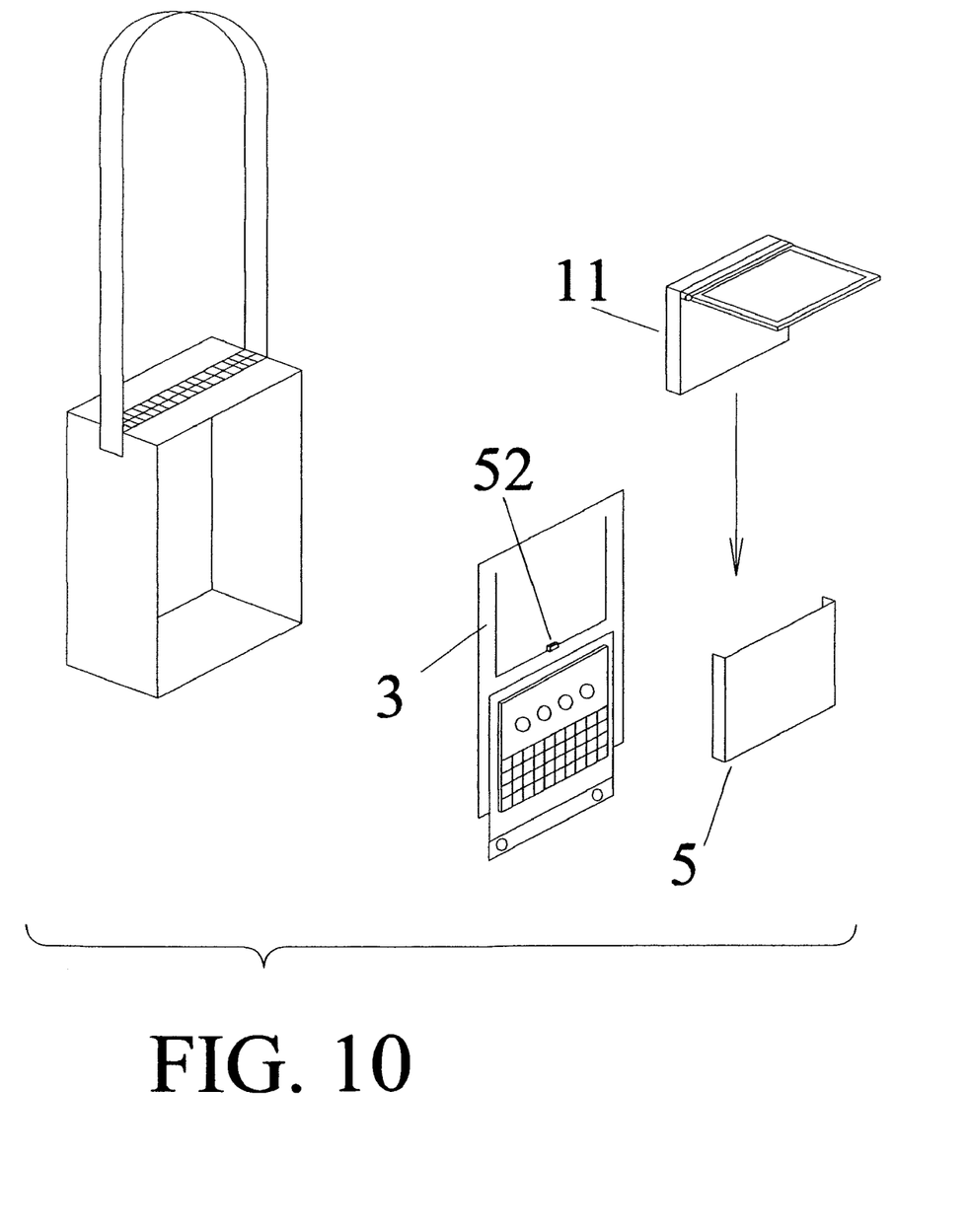
FIG. 10 This is an exploded view of a bag computer where the two panel computer is connected to a bag electrical connection in the computer holder to conduct electricity to the inside of the bag.

A third embodiment, shown in exploded view FIG. 10, the interior access coupling provides access to two panel computer controls, electrical plugs and peripheral mounts by employing a bag front wall 3 electrical connection 52, which constitutes the bag part interior access coupling, adjacent to the back surface of the matching the body panel 11 when held in the computer holder 5. The bag interior access coupling is located on the bag front wall 3 adjacent to the computer holder 5 so that it is aligned with and may be engaged while the body panel is in the computer holder.

Figure 11:
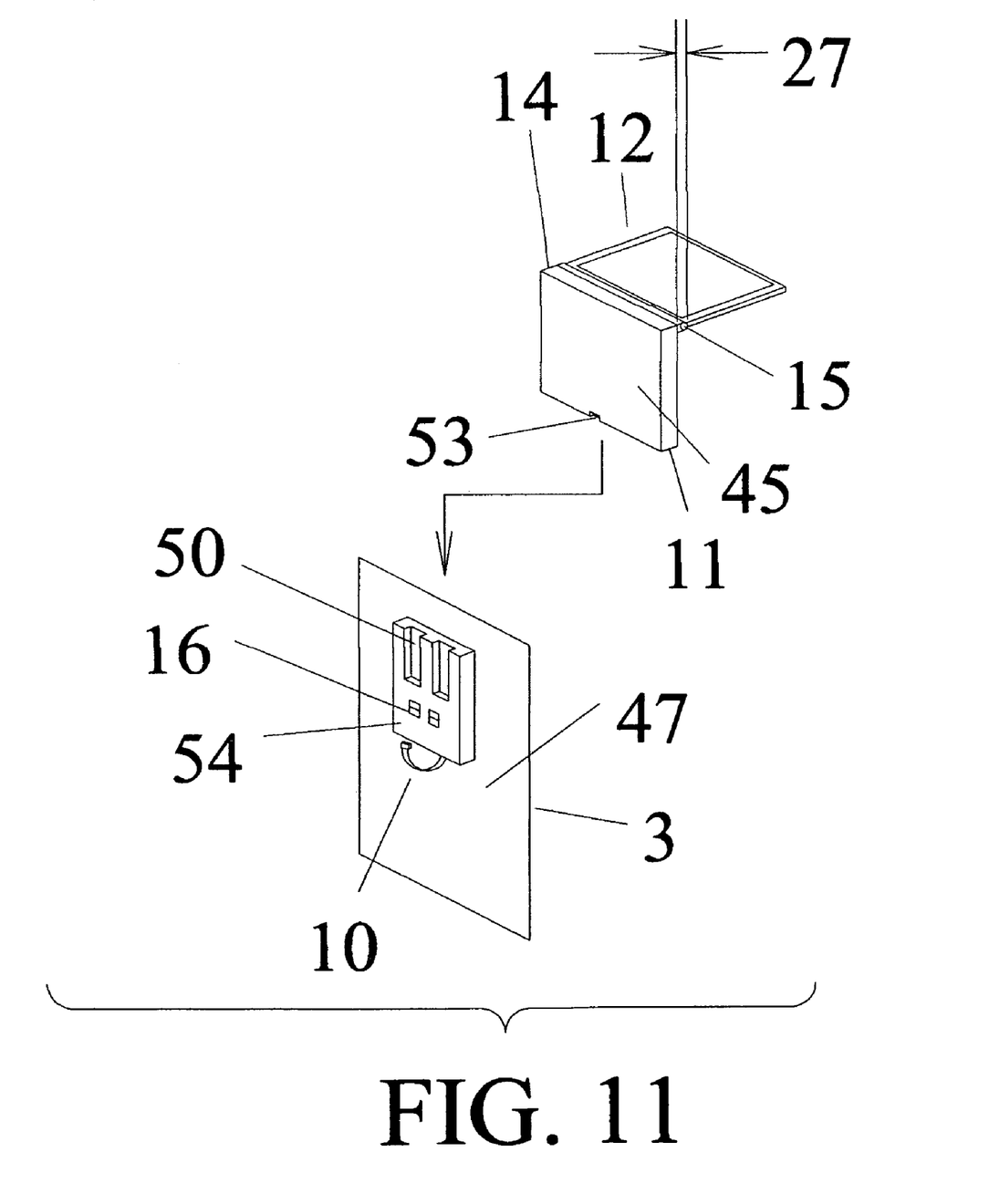
FIG. 11 This is a view of the bag computer of FIG. 10 showing its front wall inside surface, the electrical connection box attached there and the back side of the body panel with electrical connection.

Shown in FIG. 11, a view of the inside surface of the bag front wall and back side of the two panel computer's body panel, the bag part interior access coupling, in this case a front wall electrical connection, is positioned on the exterior of front wall so it may be engaged to a matching two panel computer electrical connection 53, constituting the computer part interior access coupling, on the body panel 11 when the two panel computer is installed into the computer holder. For example, the body panel electrical connection may be near the bottom of the body panel back surface 45 and the matching bag front wall electrical connection may be near the bottom inside of the computer holder. The electrical connection on the bag front wall leads though the bag front wall and to the interior of the bag.

To facilitate the connection of peripherals or other computer equipment on the inside of the bag, the bag part interior access coupling may further comprise a connection box 54 attached to the inside surface 47 of the bag front wall 3 and electrically connected to the bag front wall electrical connection. The connection box may include controls, electrical plugs 16, recessed mounts 50 for peripherals or removable memory or other equipment to be electrically connected to the two panel computer. The connection box may be attached to the bag with riveting, sewing, gluing or other bonding process.

This drawing shows that the pivoting connection 15 between the two panel computer's display panel 12 and body panel 11 creates a gap 27 to allow the computer holder material to fit between the two panels when they are in stored position.

An electrical connection from the manual character input device on the bag exterior front wall to the two panel computer may be by a wire 10 leading from the input device through the bag's front wall and leading to the two panel computer's body panel.

To install the two panel computer to the bag, the body panel is inserted into the computer holder, in this case from the top, with the display panel remaining on the outside of the computer holder. As the two panel computer is installed, the two panel computer electrical connection engages with the bag front wall electrical connection to provide electrical access from the two panel computer to the bag interior and any connection box mounted to the inside surface of the bag's front wall.

The invention claimed is:

1. A computer for mobile use by an operator, the computer comprising:
   a) a display panel having a front side including a display, an opposite back side and a hinge edge;
   b) a body panel having a front surface, an opposite back surface and a top surface;
   c) a computer part interior access coupling located on the body panel back surface;
   d) a hinge means pivotally securing the display panel hinge edge to the body panel near a junction of the top and front body panel surfaces wherein the hinge means holds the display facing away from the body panel when the display panel is in a closed position, and holds the display panel away from the body panel far enough to allow computer holder material to fit between the display panel and the body panel when the display panel is in the closed position;
   e) a bag having a front wall and a top wall including a top opening for providing access to the interior of the bag wherein each wall has an inside surface and an outside surface, f) a computer holder attached to the outside surface of the front wall of the bag and fitting the body panel and designed to hold the body panel so the display panel can pivot near a junction of the top and front bag walls from a position approximately parallel to the front wall into a line of sight of the operator wearing the bag; and g) a bag part interior access coupling attached to the bag front wall and matching the computer part interior access coupling and positioned to engage the body panel held in the computer holder.

2. The computer of claim 1 wherein the bag part interior access coupling comprises an opening in the bag front wall adjacent to the computer holder and including an opening rim, and at least one of attachments and alignment structures matching the computer part interior access coupling wherein the computer part interior access coupling comprises attachments and alignment structures on the body panel back side corresponding to the at least one of attachments and alignment structures of the bag part interior access coupling.

3. The computer of claim 1 wherein the bag part interior access coupling comprises a pattern of holes in the bag front wall adjacent to the computer holder and matching the computer part interior access coupling wherein the computer part interior access coupling comprises a front body panel part and back body panel part having matching attachments designed to attach through the pattern of holes in the bag front wall.

4. The computer of claim 1 wherein the bag part interior access coupling comprises an electrical connection in the bag front wall adjacent to the computer holder and with an electrical connection leading through the bag front wall to the bag interior and matching the computer part interior access coupling wherein the computer part interior access coupling comprises an electrical connection on the body panel.

5. The computer of claim 4 further comprising a connection box attached to the inside surface of the bag front wall and connected to the electrical connection through the bag front wall.

6. The computer of claim 1, wherein the back side of the display panel further comprises controls to operate the computer.

* * * * *